(12) United States Patent
Kitagawa et al.

(10) Patent No.: US 7,520,122 B2
(45) Date of Patent: Apr. 21, 2009

(54) CABLE PROTECTION AND GUIDE DEVICE

(75) Inventors: Seiji Kitagawa, Osaka (JP); Masaaki Ikeda, Osaka (JP); Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 12/027,993

(22) Filed: Feb. 7, 2008

(65) Prior Publication Data

US 2008/0264032 A1  Oct. 30, 2008

(30) Foreign Application Priority Data

Apr. 27, 2007  (JP) .............................. 2007-119287

(51) Int. Cl.
F16G 13/16 (2006.01)

(52) U.S. Cl. .............................. 59/78.1; 59/900; 248/49; 248/51

(58) Field of Classification Search .................. 59/78.1, 59/900; 248/49, 51
See application file for complete search history.

(56) References Cited

U.S. PATENT DOCUMENTS

| | | | | |
|---|---|---|---|---|
| 6,170,249 B1 * | 1/2001 | Blase et al. | ................... | 59/78.1 |
| 6,176,072 B1 * | 1/2001 | Weber | ......................... | 248/49 |
| 6,550,233 B2 * | 4/2003 | Blase | ........................... | 59/78.1 |
| 6,688,096 B2 | 2/2004 | Wada et al. | | |
| 6,773,297 B2 | 8/2004 | Komiya | | |
| 6,966,527 B2 | 11/2005 | Komiya | | |
| 7,150,206 B2 * | 12/2006 | Utaki | ............................ | 59/78.1 |
| 7,211,730 B2 | 5/2007 | Ikeda et al. | | |
| 7,249,452 B2 * | 7/2007 | Komiya | ........................ | 59/78.1 |
| 7,290,384 B2 * | 11/2007 | Weber et al. | ................... | 248/51 |
| 7,310,936 B2 * | 12/2007 | Saiki et al. | .................... | 59/78.1 |
| 2006/0096772 A1 | 5/2006 | Komiya | | |
| 2006/0237212 A1 | 10/2006 | Komiya | | |
| 2006/0289188 A1 | 12/2006 | Komiya | | |
| 2007/0218829 A1 | 9/2007 | Utaki | | |
| 2007/0228227 A1 | 10/2007 | Utaki | | |
| 2007/0241239 A1 | 10/2007 | Utaki | | |

FOREIGN PATENT DOCUMENTS

JP                3259964        12/1997

OTHER PUBLICATIONS

U.S. Appl. No. 12/016,832, Utaki, Entire Document.

* cited by examiner

Primary Examiner—David B Jones
(74) Attorney, Agent, or Firm—Woodling, Krost and Rust

(57) ABSTRACT

A cable protection and guide device in which maintenance of cables is easily performed without completely removing a cable accommodating space extension arm from a side plate is disclosed. Inadvertent disengagement of the cable accommodating space extension arm is prevented because the arm strongly engages the side plates of the device. The cable protection and guide device includes a number of pairs of right and left side plates connected to each other. Cable accommodating space extension arms are bridged over the flexional inner circumferential sides of at least one pair of side plates. D-shaped pin hinge shafts in the hinge ends of the arms are detachably interengaged with a groove in one of the side plates and thus permits the arm to pivot with respect to the side plate. Hinge end side locking pawl pieces of the arms are interlocked to the side plates.

12 Claims, 9 Drawing Sheets

CABLE PROTECTION AND GUIDE DEVICE

This application claims priority to Japanese Patent Application 2007-119287 filed Apr. 27, 2007.

TECHNICAL FIELD

The present invention relates to a cable protection and guide device. More specifically it relates to a cable protection and guide device suitable for accommodating a cable(s) or a hose (s) which supplies a movable member of an industrial machine with electric power or energy of compressed air. The cable is guided and protected even during movement of the movable portion.

BACKGROUND TECHNOLOGY

An energy guide chain is known in which a number of pairs of right and left spaced connecting plates are connected in a longitudinal direction and a cross member formed as a U-link member is bridged over at least one of the flexional inner circumferential side and the flexional outer circumferential side. This cross member is attached such that a protruded portion formed in the connecting plate and directed to the inside of the chain is snapped into a fixed recess portion of the cross member. See, Patent Reference 1, which is Japanese Patent No. 3259964.

Problems to be Solved by the Invention

However, in the above-mentioned conventional energy guide chain, if a cross member is bent and the protruded portions of a pair of right and left connecting plates must be removed from fixed recess portions formed on both end portions of the cross member, maintenance is difficult. That is, if each cross member must be completely removed from a pair of right and left connecting plates, the cables cannot be operated from the outside. Thus, a problem exists in that the conventional energy guide chain requires extensive labor in removing each cross member.

Accordingly, an object of the present invention is to solve the problems of the prior art and provide a cable protection and guide device in which maintenance of the cables is easy without completely removing a cable accommodating space extension arm from a side plate. Further, it is desirable to have a cable protection and guide device which is structurally sound and the cable accommodating space extension arm is rigidly engaged during operation.

Means for Solving the Problems

The present invention solves the above-mentioned problems. The cable protection and guide device of the instant invention includes a number of pairs of right and left spaced side plates connected to each other in a longitudinal direction of the connection. Cable accommodating space extension arms are respectively bridged over at least ones of flexional inner circumferential side plates so that a number of cables are accommodated in a cable accommodating space. The cable accommodating space is openable and is formed by pivoting an opening/closing side about a hinge end side of the cable accommodating space extension arm along the longitudinal direction. The connection of the cable accommodating space extension arms are guided and secured.

A "D-shaped" pin type hinge shaft protrudes from the front and rear positions of the hinge end of the cable accommodating space extension arm. The "D-shaped" pin type hinge shafts on the hinge end side of the cable accommodating space extension arm are detachably pivoted to hinge supporting grooves on one side plate of the pair of plates. The "D-shaped" pin type hinge shaft on the hinge end of the cable accommodating space extension arm is fitted from the outside in the connected width direction of the side plate. The hinge end of the cable accommodating space extension arm also includes a hinge end side locking pawl piece which protrudes at the center position on the hinge end side of the cable accommodating space extension arm in the connected direction. A disconnection in the connected width direction is prevented in a bridged manner as the arm is engageably locked to a hinge end side locking groove at the center position of the one side plate.

The present invention further solves the above-mentioned problems because the distance between a hinge end and an opening/closing end of the cable accommodating space extension arm is set to be narrower than the distance between the pair of right and left side plates.

The present invention further solves the above-mentioned problems through the use of an opening/closing indicating mark which indicates an opening/closing operable position of the cable accommodating space extension arm on an opening/closing end side of the cable accommodating space extension arm.

The present invention further solves the above-mentioned problems through the use of round pin-shaped locking shafts which protrude at front and rear positions of the opening/closing end side of the cable accommodating space extension arm in the connected longitudinal direction. The round pin-shaped locking shafts are pivotedly engageable with opening/closing locking grooves in the other side plate. The round pin-shaped pin locking shaft of the opening/closing end of the arm is fitted from the outside in the connected width direction of the side plate. The opening/closing end of the arm includes a side locking pawl piece which protrudes generally from the center position of the hinge end side of the cable accommodating space extension arm in the connected direction. The side locking pawl piece prevents disconnection in the connected width direction and is engageably locked to an opening/closing end side locking groove at the center position of the other side plate.

The present invention further solves the above-mentioned problems because the pair of right and left side plates are integrally molded with a connecting plate which is bridged on the flexional outer circumferential side. Alternatively, the connecting plate may be bridged across the inner flexional circumferential side and the cable accommodating space extension arm may be bridged across the outer flexional circumferential side. Still alternatively, the side plates may be adapted to include the locking grooves on the outer flexional circumferential side.

Effects of the Invention

According to the present invention, a number of pairs of right and left spaced side plates are connected to each other in a longitudinal direction of the connection and cable accommodating space extension arms are respectively bridged over at least the flexional inner circumferential side plates or the flexional outer circumferential side plates so that a number of cables are accommodated in a cable accommodating space. The cable accommodating space may be openably formed by pivoting an opening/closing side about a hinge end side of the cable accommodating space extension arm along the longitudinal direction of the connection to be guided. Additionally, the following effects can be obtained.

That is, the cable protection and guide device includes hinge shafts which protrude at front and rear positions on the hinge end side of the cable accommodating space extension arm. The hinge shafts are pivotedly engageable with hinge supporting grooves respectively provided at front and rear positions of one of the side plates. The hinge shafts are fitted from the outside in the connected width direction of the side plate. A pair of front and rear hinge shafts strongly engage a pair of front and rear hinge supporting grooves. Thus even if force acts on the cable accommodating space extension arm so as to vertically protrude from the hinge supporting groove due to inside movement of the cables. An inadvertent disengagement of hinge ends of the cable accommodating space extension arm in a vertical direction can be completely prevented. Further, a hinge end side locking pawl piece protrudes in the center position on the hinge end side of the cable accommodating space extension arm in the connected direction is engageably locked to a hinge end side locking groove provided at the center position of the one side plate. Thus even if force, which acts on the cable accommodating space extension arm due to inside movement of the cables, since a hinge end side locking pawl piece of the arm engages with a hinge end side locking groove, disengagement in the connected width direction is blocked in a bridged manner. An inadvertent disengagement of hinge ends of the cable accommodating space extension arm in the connected width direction can be completely prevented.

Further, since the hinge shafts of the cable accommodating space extension arm are formed in a "D-shaped" pin type in which a cable accommodating space side of the shafts are cut out, and the pins are arranged in a bridged manner, the hinge shafts come into contact with inner walls of the supporting grooves by use of a "D-shaped" pin arc surface at the time of pivoting the cable accommodating space extension arm. Thus, a smooth pivoting operation of the cable accommodating space extension arm can be realized. Additionally, a gap in a vertical direction of the hinge supporting groove is generated between the inner wall of the hinge supporting groove and the hinge shaft by a part of a "D-shaped" pin cut out portion of the hinge shaft. The gap enables use of a hinge end side locking pawl piece larger in size in the vertical direction of the hinge supporting groove in a bridged manner as compared with use of a round pin type of the hinge shaft. Engagement force in the connected width direction between the hinge end side locking pawl piece and the hinge end side locking groove is increased. Further, since the "D-shaped" pin type cut out portion of the hinge shaft faces a cable accommodating space side at the time of attachment of the cable accommodating space extension arm, strong engagement force exists without affecting the engagement condition in the vertical direction of the hinge supporting groove between the hinge shaft and the hinge supporting groove.

The cable accommodating space extension arm is formed so as to be pivoted using a pair of front and rear hinge shafts. A cable accommodating space extension arm is pivoted with respect to a side plate without completely removing the cable accommodating space extension arm from the side plate during maintenance. Cables can be exposed in such a manner that the cables are easily reached from outside the device. Thus, maintenance of the cables is simplified and easy.

According to the cable protection and guide device of the present invention the distance between a hinge end and an opening/closing end of the cable accommodating space extension arm is narrower than the distance between the pair of right and left side plates. A deflection is generated in the cable accommodating space extension arm so that a sandwiching force is generated in a direction where a pair of right and left side plates are sandwiched. Thus engagement conditions between the cable accommodating space extension arm and the pair of right and left side plates can be further strengthened.

An opening/closing indicating mark which indicates an opening/closing operable position of the cable accommodating space extension arm is provided on an opening/closing end side of the cable accommodating space extension arm. The position of the opening/closing of the cable accommodating space extension arm can be determined by visual inspection. Thus, maintenance of the cables and the cable accommodating space extension arm attachment operation, which requires an opening/closing operation of the cable accommodating space arm, can be easily attained.

Round pin-shaped locking shafts respectively protrude at front and rear positions of the opening/closing end side of the cable accommodating space extension arm and are lockably pivoted to opening/closing locking grooves respectively provided at front and rear positions of the other side plate. The round pin-shaped pin locking shaft is fitted from the outside in the connected width direction of the side plate. Even if the force that jumps out in a vertical direction of the hinge supporting groove due to the inside movement of the cables is generated in the cable accommodating space extension arm, the pair of front and rear locking shafts are pivoted to a pair of front and rear opening/closing locking grooves at front and rear two positions in the connected longitudinal direction so that strong engagement force exists. Thus, an inadvertent disengagement of the opening/closing end of the cable accommodating space extension arm in the vertical direction of the hinge supporting groove can be completely blocked. Further, an opening/closing end side locking pawl piece protrudes in the center position on the hinge end side of the cable accommodating space extension arm in the connected direction. A disconnection in the connected width direction is prevented in a bridged manner. The end side locking pawl piece is engageably locked to an opening/closing end side locking groove at the center position of the other side plate. Even if the force that jumps out in the connected direction due to the inside movement of the cables is generated in the cable accommodating space extension arm, the hinge end side locking pawl piece engages with a hinge end locking groove whereby disengagement in the connected width direction is blocked in a bridged manner so that strong engagement force is exhibited at the center position in the connected longitudinal direction. Thus an inadvertent disengagement of the opening/closing end of the cable accommodating space extension arm in the connected width direction of the side plate can be completely blocked.

The pair of right and left side plates is integrally molded by a connecting plate which is bridged across on a flexional inner circumferential side or a flexional outer circumferential side when the cables are protected and guided while flexing them. Even if the cables receive a shearing force in the width direction, a connecting plate bridged over a pair of right and left side plates strongly ensures the cable accommodating space. Thus even in flexion and elongation operation for a long period of time, excellent dimensional stability and endurance can be exhibited.

A number of pairs of right and left spaced side plates are connected to each other in a longitudinal direction of the connection and cable accommodating space extension arms are respectively bridged over at least ones of flexional inner circumferential side plates or flexional outer circumferential side plates so that a number of cables are accommodated in a cable accommodating space. The cable accommodating space is openably formed by pivoting an opening/closing side about a hinge end side of the cable accommodating space extension arm along the longitudinal direction of the connection to be guided. Cable accommodating space side-cutout "D-shaped" pin type hinge shafts respectively protrude at front and rear positions of a connected longitudinal direction on a hinge end side of the cable accommodating space extension arm in a bridged manner. The "D-shaped" pin type hinge shafts are detachably pivoted to hinge supporting grooves in front and rear positions in the connected longitudinal direction on a hinge end corresponding side of the side plate. The "D-shaped" pin type hinge shaft is fitted from the outside in the connected width direction of the side plate. The hinge end side of the cable accommodating space extension arm includes a hinge end side locking pawl piece which protrudes at the center position on the hinge end side of the cable accommodating space extension arm. Disconnection in the connected width direction is prevented in a bridged manner and the hinge end side locking pawl piece is engageably locked to a hinge end side locking groove in the center position of the one side plate. Maintenance operation of the cables is easily attained without completely removing the cable accommodating space extension arm from the side plates and strong engagement force exist in all directions. An inadvertent disengagement of the cable accommodating space extension arm is completely blocked. Those skilled in the art will recognize that changes to the examples set forth herein may be made without departing from the spirit and the scope of the claims set forth below.

In a pair of right and left side plates adopted in the cable protection and guide device according to the present invention, a number of side plates connected to each other and connecting plates respectively bridged over a flexional inner circumferential side and a flexional outer circumferential side form the cable accommodating space. Different forms of the side plate may be used. For example, a side plate form disclosed in Japanese laid-open patent publication Nos. 2004-297856, 2005-061554 includes: a side plate front portion connected to a known preceding side plate and a side plate rear portion connected to a subsequent side plate integrally forms an oval side plate; and, a connecting pin mechanism which connects the side plates to each other and pivots them to flex is offset between a side plate rear portion of a preceding side plate and a side plate front portion of a side plate subsequent to the side plate rear portion. Alternatively, a side plate form may also be used which has been filed as Japanese patent application Nos. 2006-112087 and 2006-069527 by the present inventor and in which the side plate is integrally formed of a side plate front portion connected to a preceding side plate, a side plate rear portion connected to a subsequent side plate and a flexible coupling portion integrally intervened between the side plate front portion and the side plate rear portion and a snap-fit mechanism which connects the side plates to each other is provided between the side plate rear portion of the preceding side plate and the side plate front portion of the side plate subsequent to the side plate rear portion. And in the latter case, an inadvertent disengagement in a coupling portion of the side plate due to repeated flexional operations is avoided and a load liable to occur in a flexed area during a flexional position restriction is also avoided so that excellent endurance can be exhibited. Additionally, the number of necessary parts and the assembly required can be reduced and the maintenance during connection and disconnection of the side plates is easy.

Further, in a form of the connecting plate adopted in the cable protection and guide device of the present invention, the side plate may be integrally formed individually or together in a pair joined together.

Further, any materials of the cable accommodating space extension arm may be used in the cable protection and guide device of the present invention if they have deflective properties and dimensional stability. If a polyamide resin is adopted, since suitable deflective properties to an opening/closing operation of the cable accommodating space extension arm is exhibited and flexional strain liable to occur at the time of an opening/closing operation is endured, excellent dimensional stability is exhibited. Polyamide resin is preferred.

Any material having fatigue resistance and impact resistance may be used for the side plate and the connecting plate used in the cable protection and guide device of the present invention. Glass fiber reinforced polyamide resin is preferred since the resin exhibits excellent fatigue resistance and impact resistance to repeated flexion.

DESCRIPTION OF THE INVENTION

Example

A cable protection and guide device 100, which is an example of the present invention, will be described with reference to drawings below.

Figure 1:
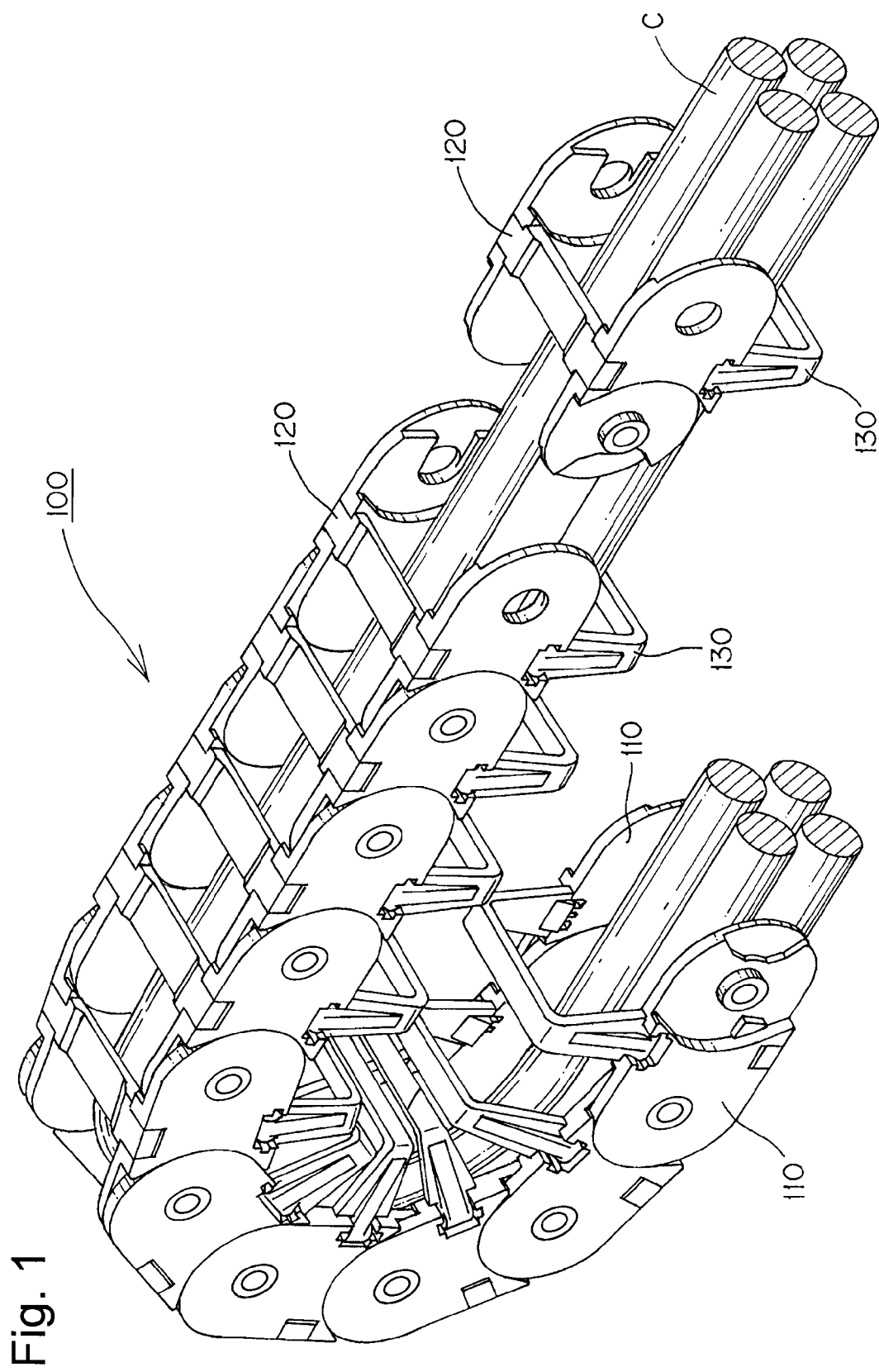
FIG. 1 is a whole schematic view of a cable protection and guide device, which is an example of the present invention.
Figure 2:
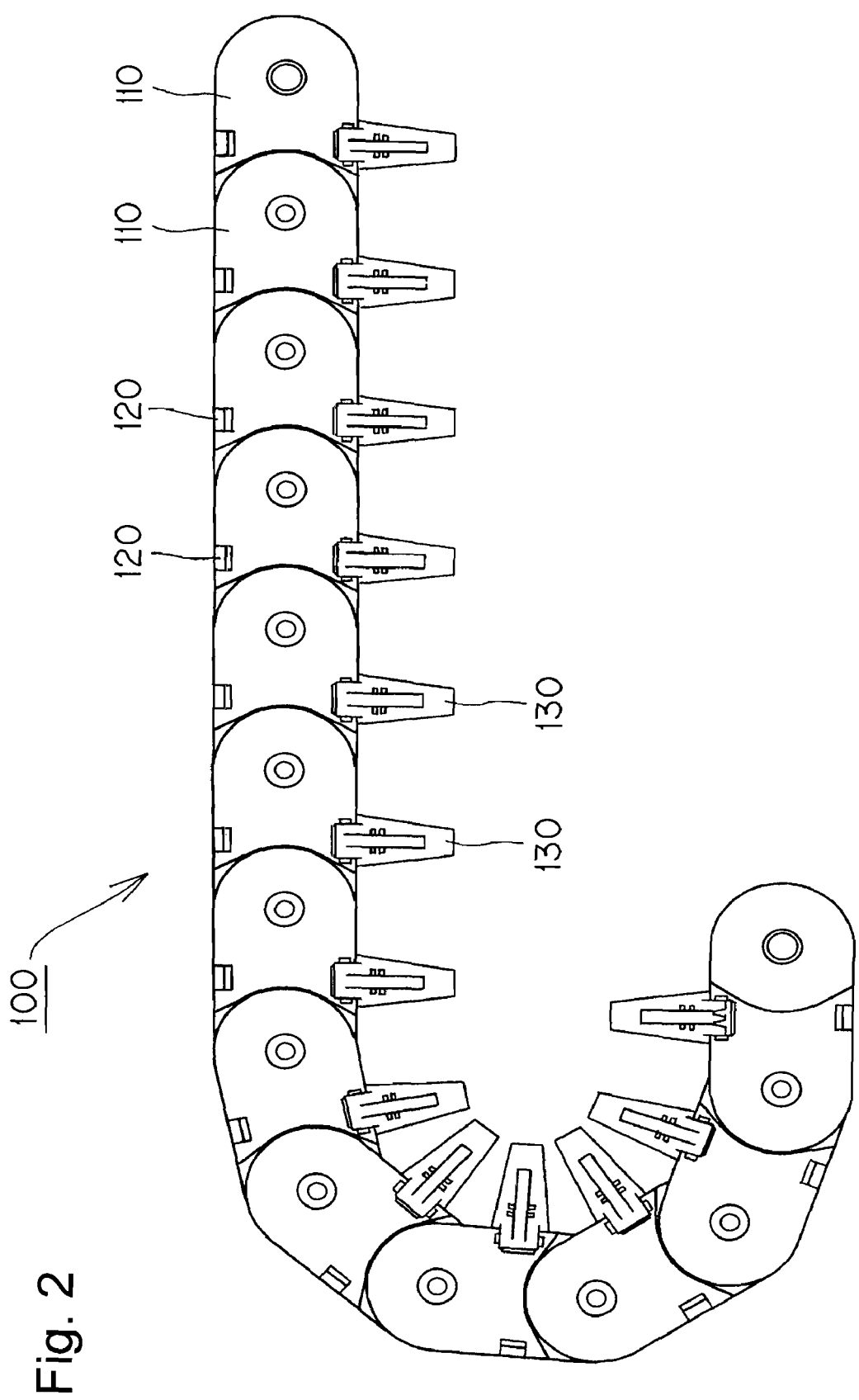
FIG. 2 is a whole plan view of the cable protection and guide device.
Figure 3:
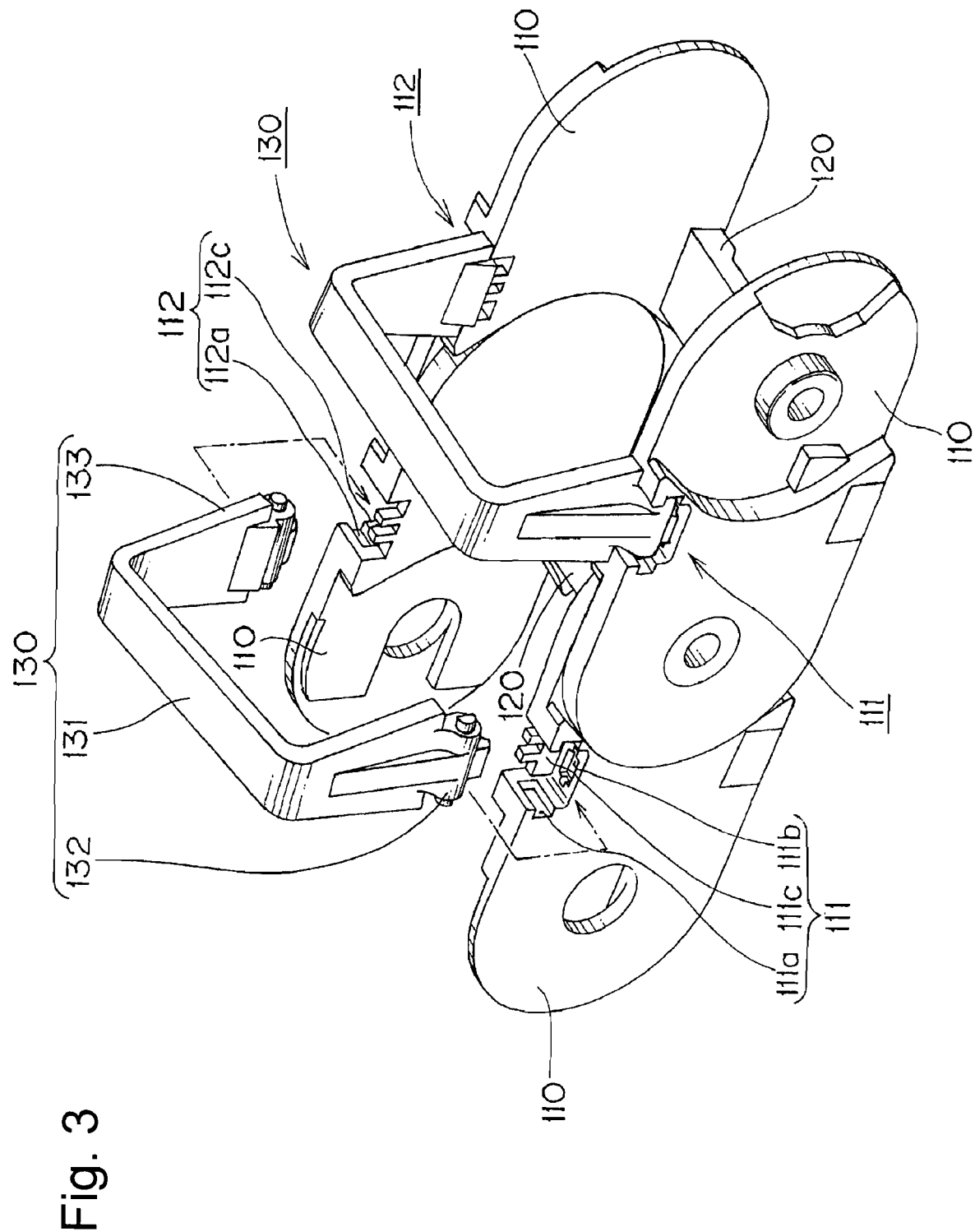
FIG. 3 is a perspective view showing a connected state of the cable protection and guide device.
Figure 4:
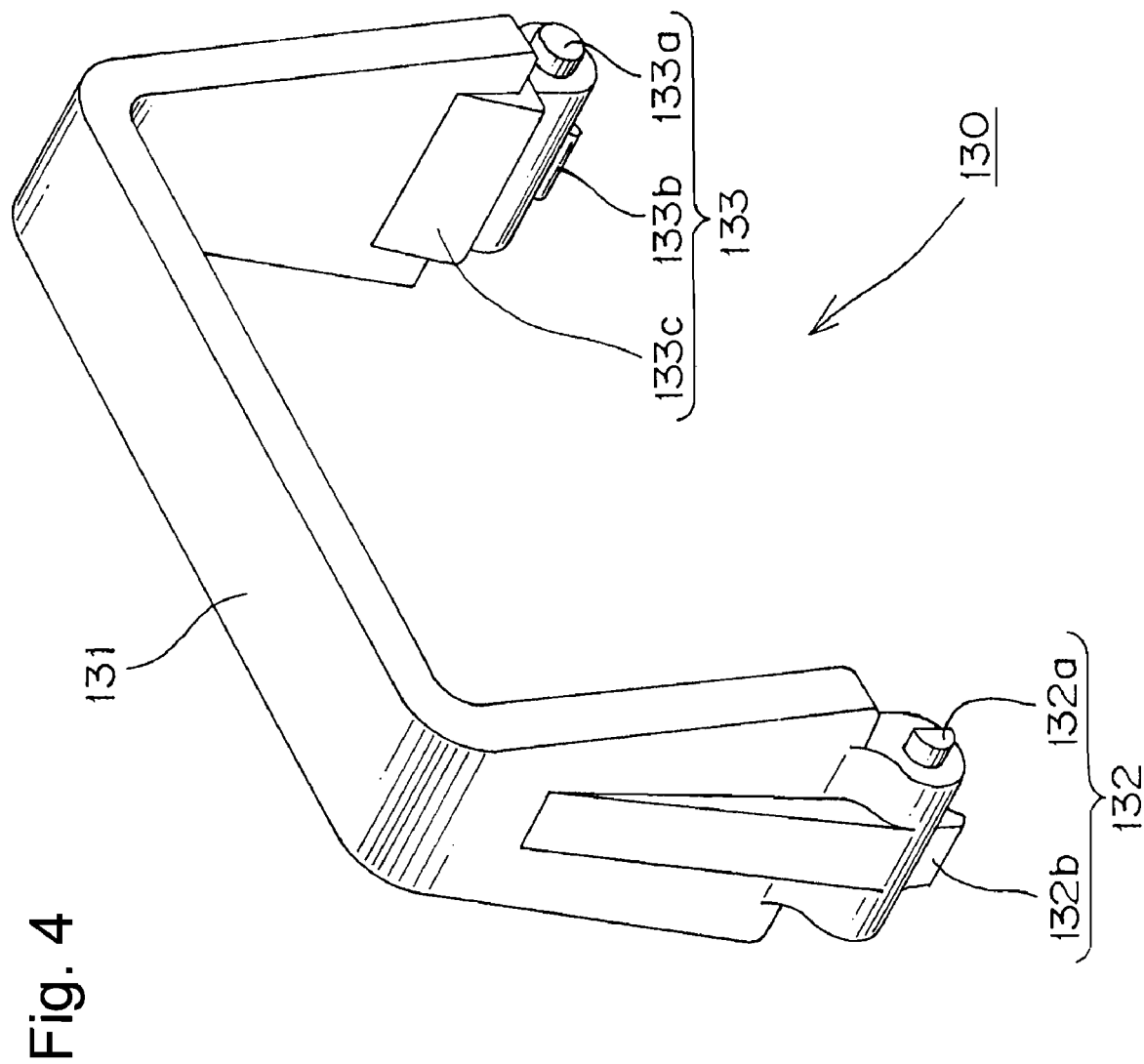
FIG. 4 is a perspective view of a cable accommodating space extension arm.
Figure 5:
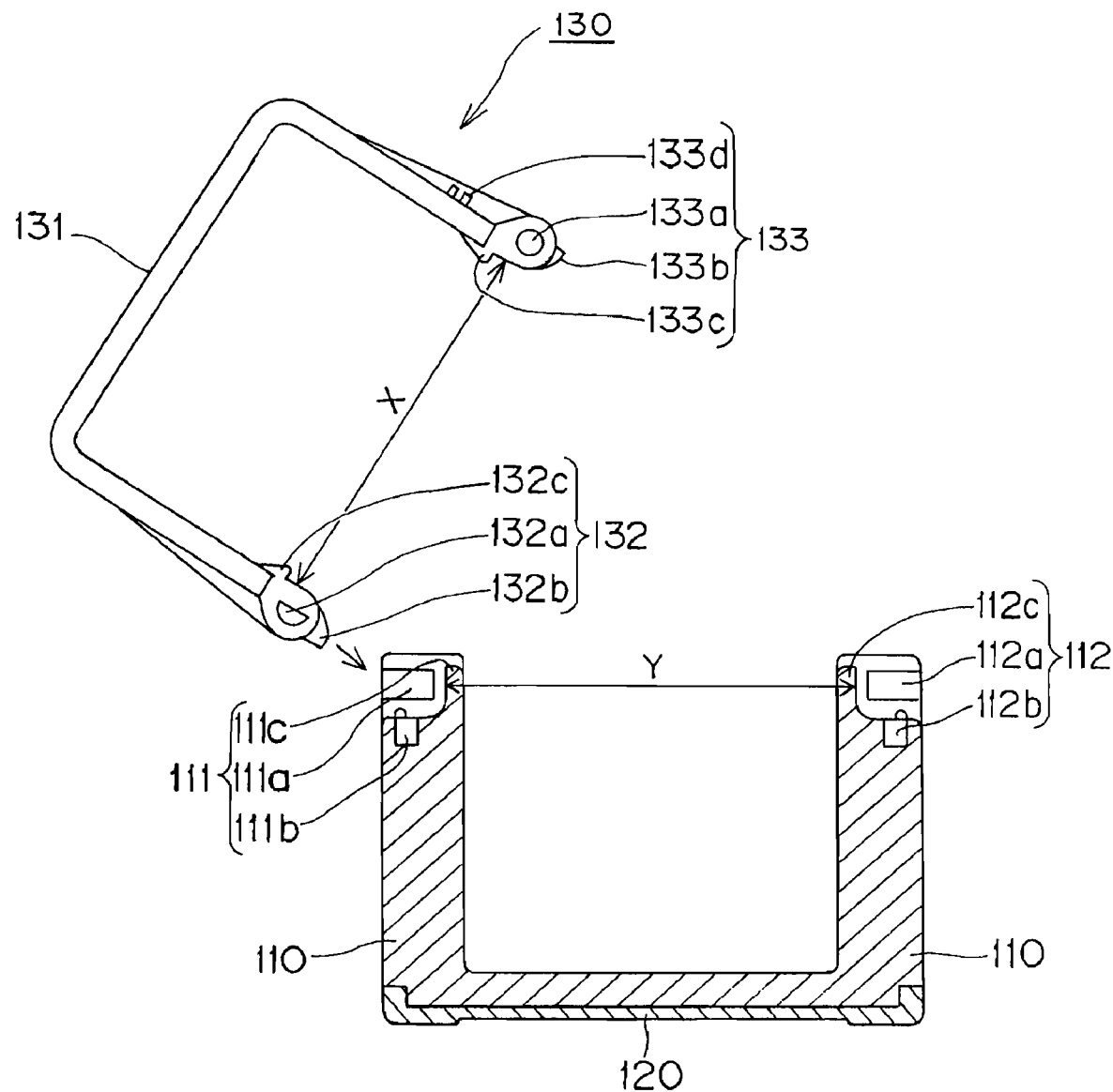
FIG. 5 is an explanatory view showing an assembly state of the cable accommodating space extension arm.
Figure 6:
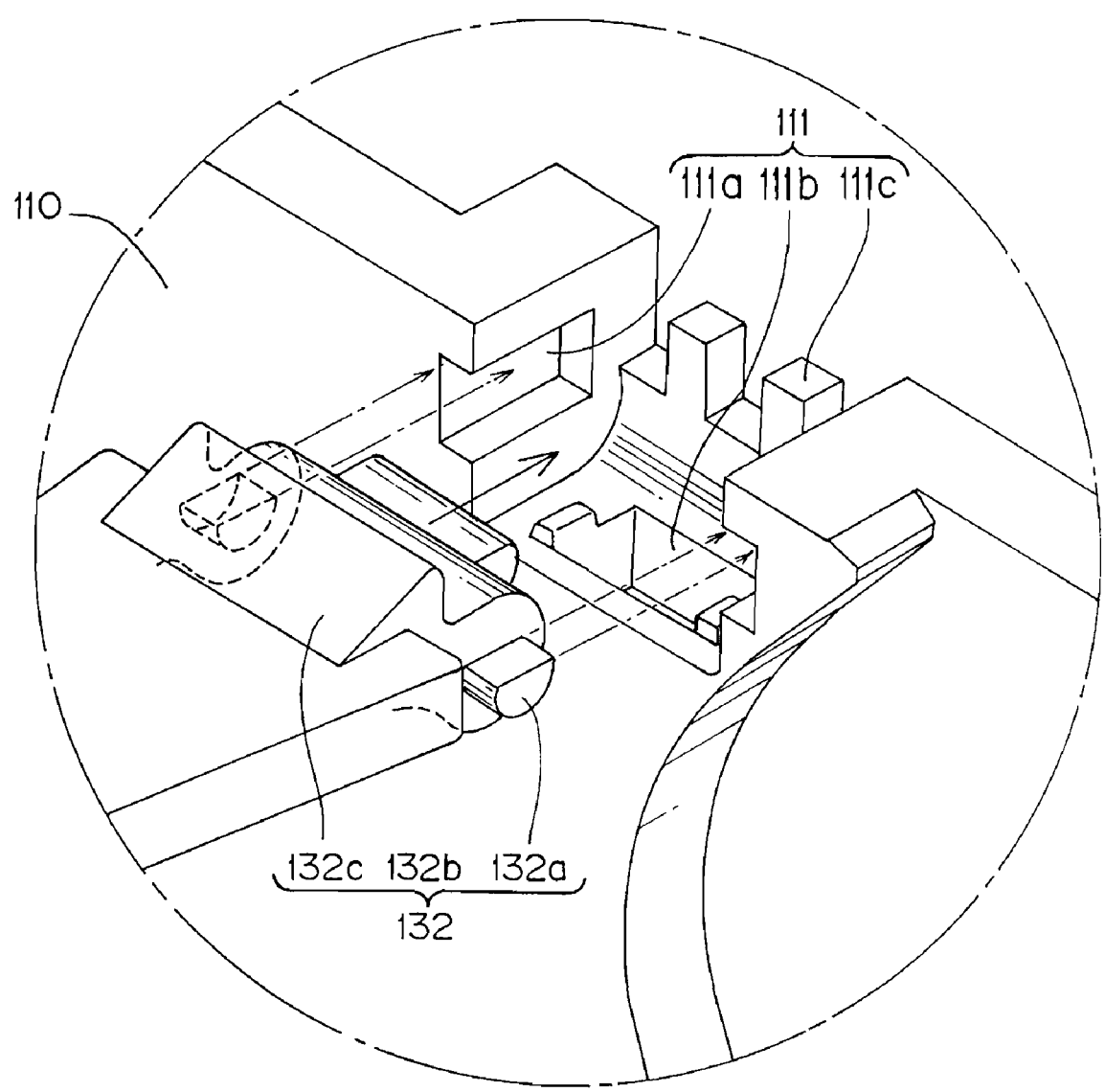
FIG. 6 is an enlarged view showing a state of just before assembly of the cable accommodating space extension arm.
Figure 7:
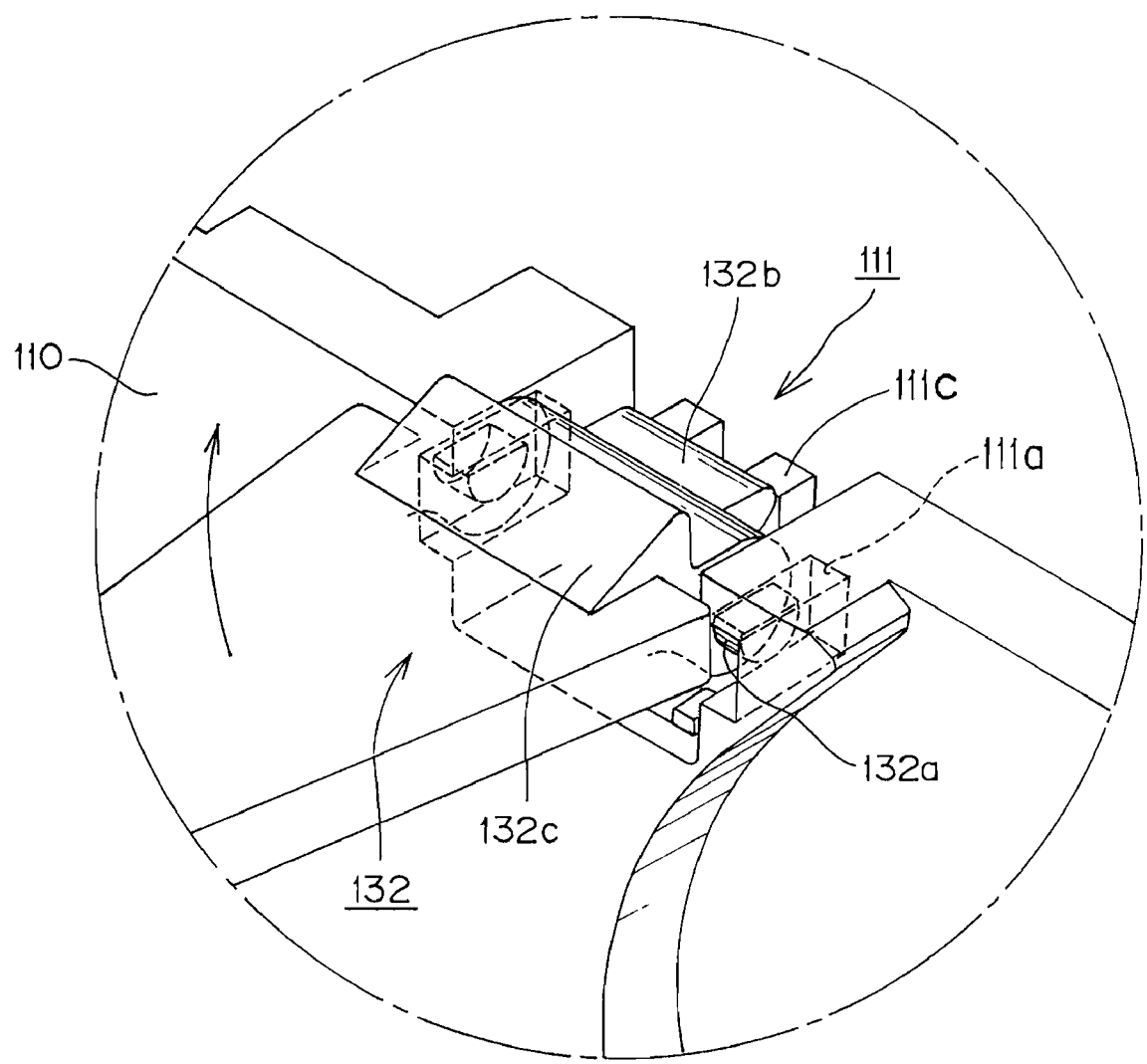
FIG. 7 is an enlarged view showing a state of fitting of the cable accommodating space extension arm.
Figure 8:
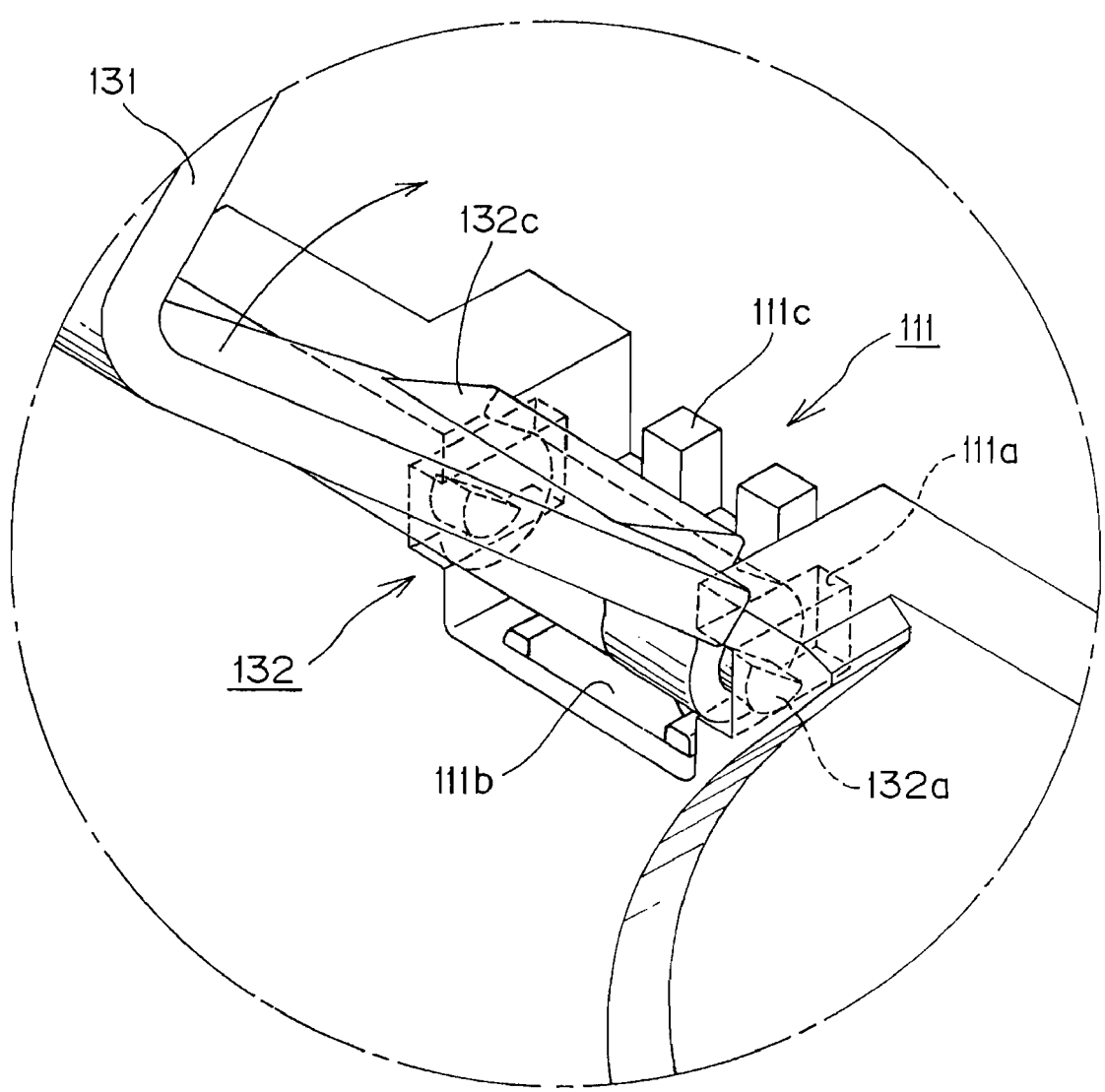
FIG. 8 is an enlarged view showing a pivot state of the cable accommodating space extension arm.
Figure 9:
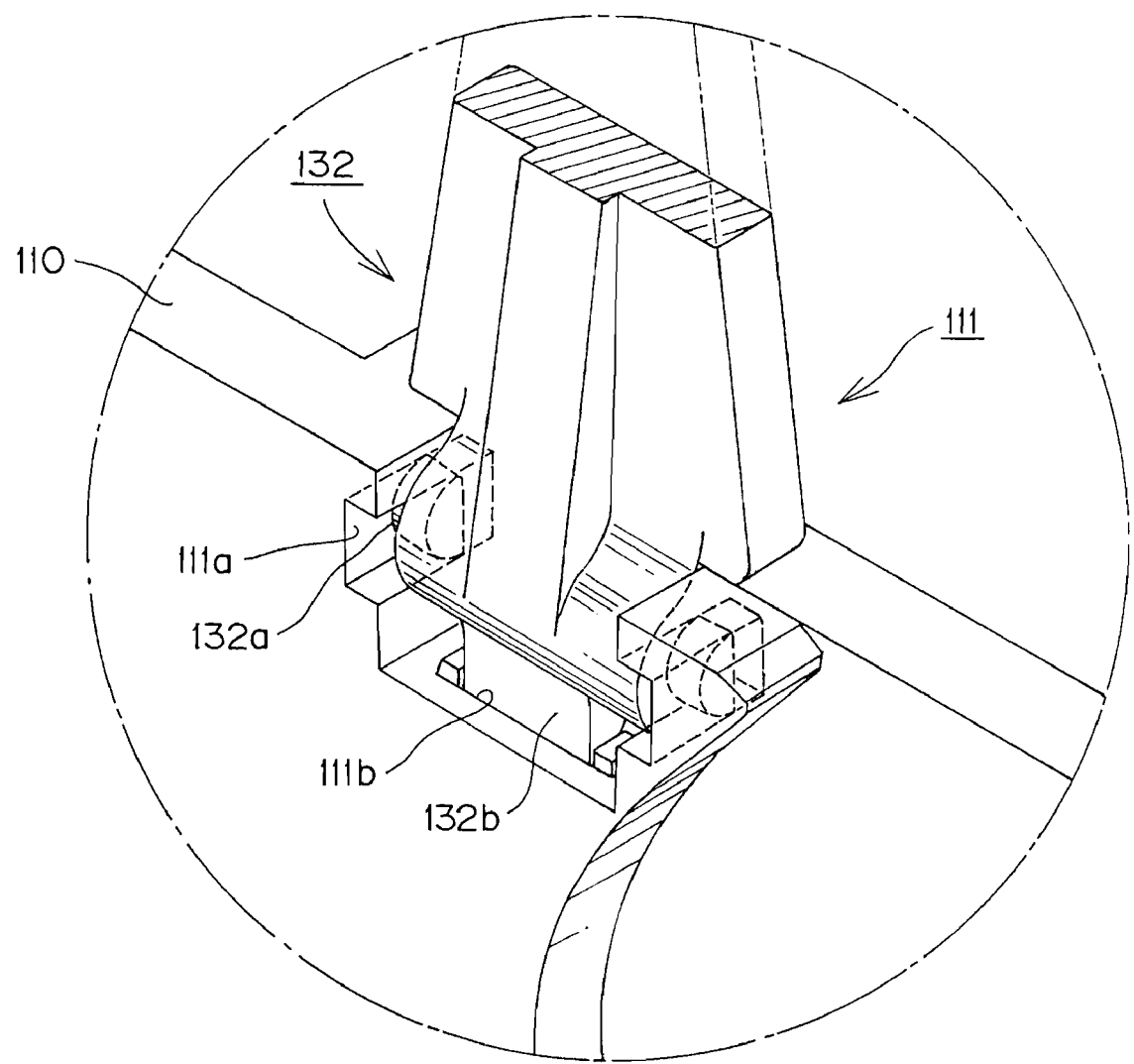
FIG. 9 is an enlarged view of an assembly completion of the cable accommodating space extension arm.

Here, FIG. 1 is a whole schematic view of a cable protection and guide device, which is an example of the present invention. FIG. 2 is a whole plan view of the cable protection and guide device. FIG. 3 is a perspective view showing a connected state of the cable protection and guide device. FIG. 4 is a perspective view of a cable accommodating space extension arm. FIG. 5 is an explanatory view showing an assembly state of the cable accommodating space extension arm. FIG. 6 is an enlarged view showing a state just before assembly of the cable accommodating space extension arm. FIG. 7 is an enlarged view showing a state of fitting of the cable accommodating space extension arm. FIG. 8 is an enlarged view showing a pivot state of the cable accommodating space extension arm. FIG. 9 is an enlarged view of an assembly completion of the cable accommodating space extension arm.

First, the cable protection and guide device 100, is used for protecting and guiding a cable (s) such as an electric cable, which connects a movable section to a stationary section in a semiconductor production device, a pharmacy development testing device, a vehicle door opening/closing device to transmit or supply electric signals, and a hose, which supplies pressure liquid or pressure gas. In the cable protection and guide device 100, a number of side plates are connected to each other in an elongated manner for connecting between the above-described stationary section and movable section. The cable protection and guide device 100 assumes a linear position or a flexional position in accordance with relative remote movement conditions between the movable section and the stationary section.

The cable protection and guide device 100, which is the present example, is formed as shown in FIGS. 1 and 2, in such a manner that a number of pairs of right and left spaced side plates 110, 110 are connected to each other from a mounting fixed end (not shown), which is mounted on the above-mentioned stationary section toward a mounting movable end (not shown), which is mounted on the movable section in a longitudinal direction of the cable. A connecting plate 120 is bridged over a flexional outer circumferential side of the side plates 110, 110 and a cable accommodating space extension arm 130 is bridged over a flexional inner circumferential side of the side plates 110, 110 so that a number of cables C are accommodated into a cable accommodating space R surrounded by these pairs of right and left side plates 110, 110, the flexional outer circumferential side connecting plates 120 and the flexional inner circumferential side cable accommodating space extension arms 130 in a connected longitudinal direction to protect and guide the cables.

Forms of the cable accommodating space extension arm 130 and a pair of right and left side plates 110, 110, which are used in the cable protection and guide device 100 of the present invention, will be described in more detail with reference to FIGS. 1 to 9.

First, as shown in FIGS. 3 to 5, the cable accommodating space extension arm 130 comprises a C-sectioned arm body 131, a hinge end 132, and an opening/closing end 133. The hinge end 132 is detachably attached to a hinge end fitting concave portion 111. The opening/closing end 133 is detachably attached to an opening/closing end fitting concave portion 112 of the pair of right and left side plates 110, 110. The arm body 131 pivots about the hinge end 132 in a connected width direction.

It is noted that the hinge end fitting concave portion 111 and the opening/closing end fitting concave portion 112 are vertically formed in the centers of a pair of right and left side plates 110, 110.

Further, as shown in FIGS. 1 and 2, even in a state where the cable protection and guide device 100 is flexed on a flexional inner circumferential side, each cable accommodating space extension arm 130 does not come into contact with another.

A hinge end 132 of the cable accommodating space extension arm 130 includes hinge shafts 132a, 132a which protrude at front and rear positions in the connected longitudinal direction. A hinge end side locking pawl piece 132b protrudes in the center position of the connected longitudinal direction and is directed in a direction where disengagement in the connected width direction is blocked in a bridged manner, as shown in FIGS. 3 to 5.

The hinge shafts 132a are fitted into hinge supporting grooves 111a, 111a respectively provided on front and rear sides of the hinge end fitting concave portion 111 of the side plate 110, in the connected longitudinal direction as shown in FIGS. 3 to 5. The hinge shaft 132a is formed to be in a "D-shaped" pin type cut out on a cable accommodating space side in a bridged manner.

The hinge end side locking pawl piece 132b is engageably fitted to a hinge end side locking groove 111b provided on a side in the vertical direction of a hinge supporting groove in the hinge end fitting concave portion 111 of the side plate 110, as shown in FIGS. 3 to 5.

It is noted that the reference numeral 132c in FIGS. 3 to 5 denotes a supporting protrusion on a side surface of a cable accommodating space of the hinge end 132 and exhibits engagement force in the vertical direction of the hinge supporting groove by cooperating with a supporting wall 111c formed in the hinge end fitting concave portion 111.

An opening/closing end 133 of the cable accommodating space extension arm 130 includes locking shafts 133a which protrude in the front and rear positions of a connected longitudinal direction and an opening/closing end side locking pawl piece 133b which protrudes in the center position of the connected longitudinal direction and which is directed in a direction where disengagement of the opening/closing 133 in the connected width direction is blocked in a bridged manner, as shown in FIGS. 3 to 5.

The locking shafts 133a are fitted into opening/closing locking grooves 112a, 112a respectively provided on front and rear sides of the opening/closing end fitting concave portion 112 of the side plate 110 in the connected longitudinal direction, as shown in FIGS. 3 to 5, and are each formed to be round pin-shaped.

The opening/closing end side locking pawl piece 133b is engageably fitted to an opening/closing end side locking groove 112b provided on a side in the vertical direction of a hinge supporting groove in the opening/closing end fitting concave portion 112 of the side plate 110, as shown in FIGS. 3 to 5.

Further, the opening/closing end 133 of the cable accommodating space extension arm 130 is provided with an opening/closing indicating mark 133d which indicates an opening/closing operable position for the cable accommodating space extension arm 130. The opening/closing indicating mark 133d is used for determining whether the hinge end 132 or the opening/closing end 133 is properly positioned.

It is noted that the reference numeral 133c in FIGS. 3 to 5 denotes a supporting protrusion provided on a side surface of a cable accommodating space side of the opening/closing end 133 and reacts against engagement force in the vertical direction of the hinge supporting groove by cooperating with supporting wall 112c formed in the opening/closing end fitting concave portion 112.

A distance X between the hinge end 132 and the opening/closing end 133 of the cable accommodating space extension arm 130 is set narrower than a distance Y between a pair of right and left side plates 110, 110 as shown in FIG. 5. A deflection may be generated in the cable accommodating space extension arm 130 so that this hinge end 132 and opening/closing end 133 sandwiches the pair of right and left side plates 110, 110.

Next, incorporation steps of the cable accommodating space extension arm 130 and the pair of right and left side plates 110, 110 will be described based on FIGS. 6 to 9.

First, as shown in FIGS. 6 and 7, when a hinge end 132 of the cable accommodating space extension arm 130 is mounted on a hinge end fitting concave portion 111 of the side plate 110, a hinge shaft 132a is fitted into the hinge end fitting concave portion 111 in a state where a "D-shaped" pin type cut out portion of the hinge shaft 132a faces the vertical direction of the hinge supporting groove.

And as shown in FIG. 8, the arm body 131 is pivoted in a connected width direction using the hinge shaft 132a fitted into the hinge end fitting concave portion 111 as the center.

As the arm body 131 is pivoted, a hinge end side locking pawl piece 132b of the hinge end 132 is fitted into a hinge end side locking groove 111b of the hinge end fitting concave portion 111.

Then the hinge shaft 132a comes into contact with an inner wall of the hinge supporting groove 111a with a "D-shaped" pin arc surface so that a smooth pivoting operation of the cable accommodating space extension arm 130 is realized.

Further, a gap in the vertical direction of the hinge supporting groove is generated between the inner wall of the hinge supporting groove 111a and the hinge shaft 132a by a part of the "D-shaped" pin cut out portion in the hinge shaft 132a whereby the hinge end side locking pawl piece 132b can be larger and fully inserted in the vertical direction of the hinge supporting groove 111a as compared with a case where the hinge shaft 132a is a round pin type.

And the arm body 131 is further pivoted from the state shown in FIG. 8 in the connected width direction so that the hinge end side locking pawl piece 132b is completely mounted on the hinge end side locking groove 111b.

Then the side surface of a cable accommodating space side of the hinge end side locking pawl piece 132b abuts on a side surface of a cable accommodating space side of the hinge end side locking groove 111b whereby engagement force is exhibited in the connected width direction.

Further, the hinge shaft 132a is fitted into a hinge end fitting concave portion 111 while a "D-shaped" pin cut out portion of the hinge shaft 132a is facing a side surface of a cable accommodating space side. This hinge shaft 132a and the hinge end fitting concave portion 111 exhibit engagement forces in the vertical direction of the hinge supporting groove.

Further, the cable accommodating space extension arm 130 is deflected to be widened and an opening/closing end 133 of the cable accommodating space extension arm 130 is fitted into an opening/closing end fitting concave portion 112 of another side plate 110.

Fitting of the opening/closing end 133 into the opening/closing end fitting concave portion 112 can fit a locking shaft 133a of the opening/closing end 133 into an opening/closing locking groove 112a. An opening/closing end side locking pawl piece 133b of the opening/locking end 133 is also fitted into an opening/closing end side locking groove 112b of the opening/closing end fitting concave portion 112.

It is noted that when the cable accommodating space extension arm 130 is removed from a pair of right and left side plates 110, 110, the incorporation steps are reversed with respect to the above-described cable accommodating space extension arm 130 and the pair of right and left side plates 110, 110 may be of course performed.

In the thus obtained cable protection and guide device 100 of the present example, hinge shafts 132a protrude from front and rear positions of the hinge end 132 side of the cable accommodating space extension arm 130 in the connected longitudinal direction. The hinge shafts 132a are pivoted on hinge supporting grooves 111a located in the front and rear positions of the hinge end corresponding side of the side plate 110 in the connected longitudinal direction.

Internal movement of the cables C may exert force in the connected width direction of the cable accommodating space extension arm 130. The hinge end side locking pawl piece 132b is engaged with the hinge end side locking groove 111b. The hinge end side locking pawl piece 132b blocks disengagement in the connected width direction in a bridged manner so that strong engagement force is exhibited at the center position of the side plate 110 in the connected longitudinal direction. An inadvertent disengagement of the hinge end 132 in the cable accommodating space extension arm 130 in the connected width direction can be completely blocked.

Further, the hinge shafts 132a in the cable accommodating space extension arm 130 are each formed in a "D-shaped" pin type, formed by cutting out on a cable accommodating space side in a bridged manner.

Therefore, since, at the time of pivoting of the cable accommodating space extension arm 130, the hinge shafts 132a are brought into contact with inner walls in the hinge supporting grooves 111a with "D-shaped" pin arc surfaces, a smooth pivoting operation of the cable accommodating space extension arm 130 can be realized. Additionally, since a gap in a vertical direction of the hinge supporting groove is generated between the inner wall of the hinge supporting groove 111a and the hinge shaft 132a by a part of a "D-shaped" pin cut out portion of the hinge shaft 132a, enabling a larger size hinge end side locking pawl piece 132b to be used. Locking pawl piece 132b can be larger in the vertical direction of the hinge supporting groove 111a as compared with use of a round pin type hinge shaft 132a. Engagement force in the connected width direction between the hinge end side locking pawl piece 132b and the hinge end side locking groove 111b is further improved. Further, since the "D-shaped" pin cut out portion of the hinge shaft 132a faces a cable accommodating space side at the time of attachment of the cable accommodating space extension arm 130, strong engagement force can be exhibited without affecting the engagement conditions in the vertical direction of the hinge supporting groove between the hinge shaft 132a and the hinge supporting groove 111a.

And the cable accommodating space extension arm 130 is formed so as to be pivoted using a pair of front and rear hinge shafts 132a, 132a at the center.

Therefore, a cable accommodating space extension arm 130 is pivoted with respect to a side plate 110 without completely removing the cable accommodating space extension arm 130 from the side plate 110 at the time of maintenance for cables C so that the cables C can be exposed in such a manner that the cables C are easily reached from outside. Thus, maintenance of the cables C is easy.

Further, the distance X between a hinge end 132 and an opening/closing end 133 of the cable accommodating space extension arm 133 is set to be narrower than the distance Y between the pair of right and left side plates 110.

If deflection is generated in the cable accommodating space extension arm 130 a sandwiching force is generated in a direction where a pair of right and left side plates 110, 110 are sandwiched. Thus engagement conditions between the cable accommodating space extension arm 130 and the pair of right and left side plates 110, 110 can be further strengthened.

Further, an opening/closing indicating mark 133d is provided on an opening/closing end 133 side of the cable accommodating space extension arm 130.

Therefore, an opening/closing operable position in the cable accommodating space extension arm 130 can be determined by visual recognition from outside the device. Thus, maintenance of cables C, or movement or attachment of the cable accommodating space extension which requires an opening/closing operation of the cable accommodating space arm 130, can be easily attained.

Further, round pin-shaped locking shafts 133a protrude in front and rear positions of the opening/closing end 133 side of the cable accommodating space extension arm 130 in the connected longitudinal direction. Round pin-shaped locking shafts 133a are lockably pivoted to opening/closing locking grooves 112a in front and rear positions of the other side plate 110. Round pin-shaped pin locking shaft 133a is fitted from the outside in the connected width direction of the side plate.

Therefore, even if a vertical force is applied to the cable accommodating space extension arm 130 due to the inside movement of cables C, the pair of front and rear locking shafts 133*a* are pivoted to a pair of front and rear opening/closing locking grooves 112*a*, 112*a* at front and rear two positions in the connected longitudinal direction so that a strong engagement force is exhibited. Thus an inadvertent disengagement of the opening/closing end 133 of the cable accommodating space extension arm 130 in the vertical direction of the hinge supporting groove can be completely blocked.

Further, an opening/closing end side locking pawl piece 133*b*, protrudes in the center position of the hinge 133 end side of the cable accommodating space extension arm 130 in the connected direction and disconnection in the connected width direction is prevented in a bridged manner. The opening/closing end side locking pawl piece 133*b* is engageably locked in an opening/closing end side locking groove 112*b* at the center position of the other side plate.

Therefore, even if the force that jumps out in the connected direction due to the inside movement of cables C is generated in the cable accommodating space extension arm 130, the hinge end side locking pawl piece 132*b* engages with a hinge end locking groove 111*b* in an oriented state where disengagement in the connected width direction is blocked in a bridged manner. Strong engagement force is exhibited at the center position in the connected longitudinal direction of the side plate 110. Thus an inadvertent disengagement of the opening/closing end 133 of the cable accommodating space extension arm 130 in the connected width direction can be completely blocked.

And the pair of right and left side plates 110, 110 is integrally molded by a connecting plate 120, which resides in a bridged manner on the flexional outer circumferential side of the side plates.

Therefore, when the cables C are protected and guided while flexing them, even if the cables C receive shearing force in the width direction, a connecting plate 120 bridged over a pair of right and left side plates 110, 110 strongly ensures the cable accommodating space R. Thus even if flexion and elongation occurs for a long period of time, excellent dimensional stability and endurance can be exhibited. Thus the effects of the example are very large.

DESCRIPTION OF REFERENCE NUMERALS

100 . . . Cable protection and guide device
110 . . . Side plate
111 . . . Hinge end fitting concave portion
111*a* . . . Hinge supporting groove
111*b* . . . Hinge end side locking groove
111*c* . . . Supporting wall
112 . . . Opening/closing end fitting concave portion
112*a* . . . Opening/closing locking groove
112*b* . . . Opening/closing end side locking groove
112*c* . . . Supporting wall
120 . . . Connecting plate
130 . . . Cable accommodating space extension arm
131 . . . Arm body
132 . . . Hinge end
132*a* . . . Hinge shaft
132*b* . . . Hinge end side locking pawl piece
132*c* . . . Supporting protrusion
133 . . . Opening/closing end
133*a* . . . Locking shaft
133*b* . . . Opening/closing end side locking pawl piece
133*c* . . . Supporting protrusion
133*d* . . . Opening/closing indicating mark
C . . . Cable (cables)
R . . . Cable accommodating space The invention has been set forth by way of example. Those skilled in the art will readily recognize that changes may be made to the invention as set forth herein without departing from the spirit and scope of the claims set forth below.

The invention claimed is:

1. A cable protection and guide device comprising:
a number of pairs of right and left spaced side plates are articulately connected to each other in a longitudinal direction enabling said side plates to form a flexional bend having a flexional inner circumferential side and a flexional outer circumferential side;
each of said side plates includes a flexional inner circumferential side residing during bending on said flexional inner circumferential side of said bend;
each of said side plates includes a flexional outer circumferential side residing during bending on said outer flexional circumferential side of said bend;
cable accommodating space extension arms bridged over said flexional inner circumferential sides of said side plates;
connecting plates bridged over said flexional outer circumferential sides of said side plates;
each of said cable accommodating space extension arms includes a hinge end side and an opening/closing end side;
each of said cable accommodating space extension arms pivots about said hinge end side of said cable accommodating space extension arm and is guided such that said cable accommodating space extension arms may open or close;
said pairs of right and left spaced side plates, said connecting plates and said cable accommodating space extension arms form a cable accommodating space which accommodates a number of cables therein;
one of said side plates includes a hinge support groove and a hinge side locking groove;
said other of said side plates includes an opening/closing locking groove and an opening/closing side locking groove;
each hinge end side of said cable accommodating space extension arms includes a D-shaped pin type hinge shaft;
each of said D-shaped pin type hinge shafts are detachably interengaged with said hinge support groove of said one of said side plates and pivots with respect thereto;
each said hinge side of said cable accommodation space extension arms includes a hinge end side locking pawl engageably locked to said hinge side locking groove;
each of said opening/closing end sides of said cable accommodating space extension arms includes a locking shaft and an opening/closing side locking pawl;
each said locking shaft of each of said opening/closing end sides of said cable accommodating space extension arms detachably interengaged with said opening/closing locking groove of said other of said side plates; and,
each of said opening/closing locking pawls of each of said opening/closing end plates of said cable accommodating space extension arms interengageable with said opening/closing side locking groove of said other side plate.

2. A cable protection and guide device according to claim 1, wherein the distance between said hinge end and said opening/closing end of said cable accommodating space extension arm is set to be narrower than the distance between said pair of right and left side plates.

3. A cable protection and guide device according to claim 1, wherein said cable accommodating space extension arm includes an opening/closing indicating mark on said opening/closing end side of said cable accommodating space extension arm.

4. A cable protection and guide device according to claim 2, wherein said cable accommodating space extension arm includes an opening/closing indicating mark on said opening/closing end side of said cable accommodating space extension arm.

5. A cable protection and guide device according to claim 1, wherein:
said opening/closing end of said cable accommodating space extension arm includes a round pin-shaped locking shaft lockably interengaged with said opening/closing locking grooves of said other side plate.

6. A cable protection and guide device according to claim 2, wherein:
said opening/closing end of said cable accommodating space extension arm includes a round pin-shaped locking shaft lockably interengaged with said opening/closing locking grooves of said other side plate.

7. A cable protection and guide device according to claim 3, wherein:
said opening/closing end of said cable accommodating space extension arm includes a round pin-shaped locking shaft lockably interengaged with said opening/closing locking grooves of said other side plate.

8. A cable protection and guide device according to claim 4, wherein:
said opening/closing end of said cable accommodating space extension arm includes a round pin-shaped locking shaft lockably interengaged with said opening/closing locking grooves of said other side plate.

9. A cable protection and guide device according to claim 1, wherein said pair of right and left side plates are integrally molded with a connecting plate bridged across said flexional inner circumferential side.

10. A cable protection and guide device according to claim 2, wherein said pair of right and left side plates are integrally molded with a connecting plate bridged across said flexional inner circumferential side.

11. A cable protection and guide device comprising:
a number of pairs of right and left spaced side plates are articulately connected to each other in a longitudinal direction enabling said side plates to form a flexional bend having a flexional inner circumferential side and a flexional outer circumferential side;
each of said side plates includes a flexional inner circumferential side residing during bending on said flexional inner circumferential side of said bend;
each of said side plates includes a flexional outer circumferential side residing during bending on said outer flexional circumferential side of said bend;
cable accommodating space extension arms bridged over at least one of said flexional inner circumferential sides of said side plate;
a connecting plate bridged over at least one of said flexional outer circumferential sides of said side plates;
each of said cable accommodating space extension arms includes a hinge end side and an opening/closing end side;
each of said cable accommodating space extension arms pivots about said hinge end side of said cable accommodating space extension arm and is guided such that said cable accommodating space extension arms may open or close;
said pairs of right and left spaced side plates, said connecting plates and said cable accommodating space extension arms form a cable accommodating space which accommodates a number of cables therein;
one of said side plates includes a hinge support groove and a hinge side locking groove;
said other of said side plates includes an opening/closing locking groove and an opening/closing side locking groove;
each hinge end side of said cable accommodating space extension arms includes a D-shaped pin type hinge shaft;
each of said D-shaped pin type hinge shafts are detachably interengaged with said hinge support groove of said one of said side plates and pivots with respect thereto;
each said hinge side of said cable accommodation space extension arms includes a hinge end side locking pawl engageably locked to said hinge side locking groove;
each of said opening/closing end sides of said cable accommodating space extension arms includes a locking shaft and an opening/closing side locking pawl;
each said locking shaft of said opening/closing end sides of said cable accommodating space extension arms detachably interengaged with said opening/closing locking groove of said other of said side plates;
each of said opening/closing locking pawls of said opening/closing end plate of said cable accommodating space extension arms interengageable with said opening/closing side locking groove of said other side plate;
the distance between said hinge end and said opening/closing end of said cable accommodating space extension arm is set to be narrower than the distance between said pair of right and left side plates;
said cable accommodating space extension arm includes an opening/closing indicating mark on said opening/closing end side of said cable accommodating space extension arm; and,
said pair of right and left side plates are integrally molded with a connecting plate bridged across said flexional inner circumferential side.

12. A cable protection and guide device according to claim 11, wherein:
said opening/closing end of said cable accommodating space extension arm includes a round pin-shaped locking shaft lockably interengaged with said opening/closing locking grooves of said other side plate.

* * * * *